Oct. 19, 1971   J. KIWALLE   3,613,218
WELDER POWER AND DRIVE SYSTEM
Filed Aug. 25, 1969
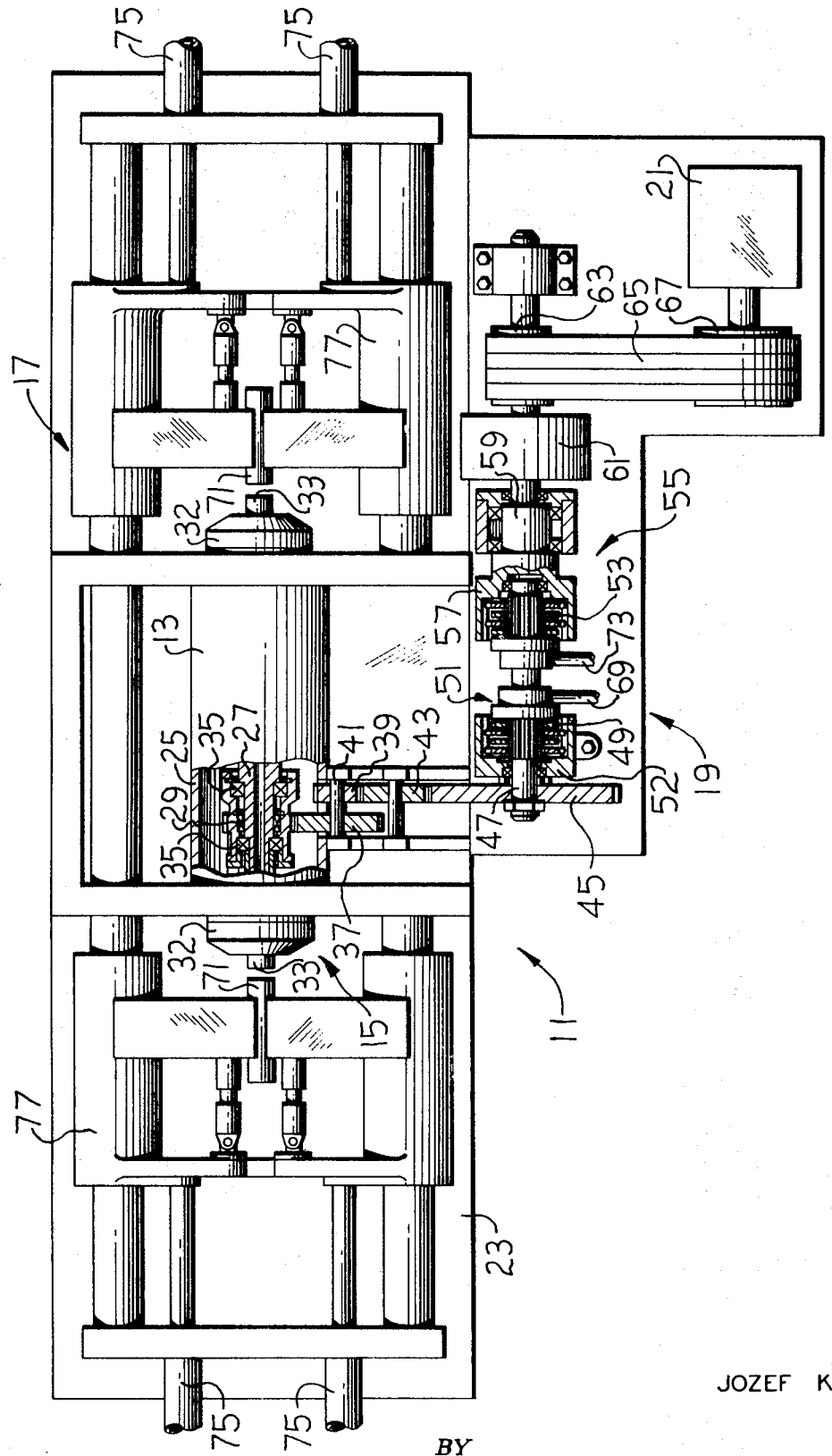
INVENTOR
JOZEF KIWALLE
BY
ATTORNEYS United States Patent Office 3,613,218
Patented Oct. 19, 1971

3,613,218
WELDER POWER AND DRIVE SYSTEM
Jozef Kiwalle, Peoria, Ill., assignor to Caterpillar
Tractor Co., Peoria, Ill.
Filed Aug. 25, 1969, Ser. No. 852,782
Int. Cl. B23k 27/00
U.S. Cl. 29—470.3
2 Claims

ABSTRACT OF THE DISCLOSURE

A power and drive system for an inertia welding machine having a power section connected to a gear train through a selectively actuatable clutch and brake. The drive train portion is connected to the rotating spindle of the machine through a one-way clutch. When the machine reaches welding speed, the selectively actuatable clutch is deactivated, the brake is actuated, and the one-way clutch allows the spindle to continue to rotate without having the flywheel or drive train mass $WK^2$ added thereto.

BACKGROUND AND SUMMARY OF THE INVENTION

This description relates to the power and drive system for an inertia welding machine, and more specifically to the means for accelerating a welding machine to extremely high rotational velocity in a short period of time. As described in this application, the invention is illustrated as driving a dual welding machine; it is to be borne in mind that the invention could be similarly utilized on a machine having only one spindle. Further, the invention could be utilized, with known structure in either a friction or inertia welding machine, as those terms have become known in the art.

The general problem solved by this invention broadly comprises the arrangement of a power and drive system for an inertia welding machine which operates the machine in an efficient and productive manner. Among the many objects accomplished by this invention are: fast acceleration, high speed, fast cycle, rigid spindle, low inertia, and means for disconnecting the spindle from the drive system.

Broadly, the invention comprises a flywheel, a drive disconnect, a braking system associated with the drive disconnect, a gear train situated between the braking system and an overrunning drive disconnect, and a welding spindle suitably driven by the overrunning disconnect. The system is formed in such a way that the flywheel may be used as power accumulation means to accelerate the spindle to a high speed in a very short time. The gear train adds no energy to the weld due to the overrunning disconnect which separates the gear from the spindle when the braking system is actuated. In this way, the inertia is kept low and small diameter pieces can be welded at an extremely high velocity. Further, through the use of a gear or other type of power train, the spindle may be driven at a speed faster than that of the drive means.

Additionally, the subject power and drive system provides a method of powering and driving an inertia welding machine to the welding speeds desired, while producing an attractive production rate by keeping the cycle time very short.

This invention, together with its further objects, advantages, modes, and embodiments will become apparent to those skilled in the art by reference to the Detailed Description and accompanying drawing which illustrates what is presently considered to be a preferred embodiment of the best mode contemplated for utilizing the novel principles set forth in the claims.

BRIEF DESCRIPTION OF THE DRAWING

The drawing illustrates a simplified plan view, partly in section, of one embodiment of a machine utilizing the present invention.

DETAILED DESCRIPTION

In greater detail, the welding machine 11 includes a dual spindle 13, a pair of tailstocks assemblies 15 and 17, a mechanical drive assembly 19, an electric motor or power supply 21, and a frame assembly 23 which supports the various machine components.

The spindle assembly 13 includes a housing 25, a hollow shaft 27 therein, a one-way or overrunning clutch 29, and a drive gear 31 which is secured for rotation on the shaft 27 and also to the outer race of the one-way clutch 29.

A chuck or holding fixture 32 is fastened to each end of the shaft 27 and each of the chucks securely holds a rotatable weld member 33.

A pair of bearing assemblies 35 is located between the drive gear 31 and the spindle shaft 27 to allow relative rotation between the two when the mechanical drive system including gear 31 is stopped before the welding takes place.

The spindle shaft 27 is rotated by means of the mechanical drive assembly 19 which includes a gear train comprised of gears 37 and 39 mounted on a common shaft 41 and gears 43 and 45. Gear 45 is secured to a shaft 47 which, in turn, is connected to both the inner section 49 of a brake assembly 51 and the inner member 53 of a clutch assembly 55. The outer member 52 of brake 51 is suitably fixed to frame 23. The outer member 52 of brake 51 is suitably fixed to frame 23. The outer member 57 of the clutch assembly 55 is fastened to a shaft 59 to which a flywheel 61 and a set of V-belt pulleys 63 is attached. Pulleys 63 are connected, via V-belts 65, to motor pulleys 67 mounted on the shaft of motor 21. Thus, when motor 21 is activated, the shaft 59 and flywheel 61 will be rotated thereby.

If it is desired that the electric motor 21 be a constant velocity, relatively low speed motor, the mechanical drive assembly 19 must be formulated in such a way as to raise the output velocity of the motor to a relatively high value by the time the rotational force reaches the chucks 32 in order to weld rather small diameter weld pieces, as well as certain weld materials. Although any of the variety of rated motor velocities can be used, if the motor selected has normal running speed of 3600 r.p.m., a proper selection of the sizes of pulleys 63 and 67 will cause shaft 59 to be driven at, perhaps, 5000 r.p.m. The gear train can then be selected so as to multiply this figure by, for example, 4.8 to give a maximum velocity at the spindle shaft 27 of about 24,000 r.p.m.

Two other prime requirements of the drive system are fast acceleration rate and small flywheel mass of $WK^2$ value.

In order to accomplish these requirements, the system provided serves to disconnect the gear train from the spindle shaft 27 at the time of welding. When the proper welding velocity has been attained by the spindle shaft, the brake assembly 51 is activated by supplying fluid to the assembly through a line 69. This will cause shaft 47 and gears 45, 43, 39, 37, and 31 to stop at a faster rate than the spindle will decelerate under influence of weld pressure. The spindle shaft 27, however, can continue to rotate since the one-way clutch assembly 29 will effectively disconnect the spindle shaft 27 from the gear train. Since the spindle shaft is now rotating independently of the gear train, the weld can be made while the gear train decelerates with no energy being added to the weld by the gear train.

In operation, a typical weld sequence to join two rotatable weld members 33 to two non-rotatable weld members 71 would be performed as follows. When the rotatable and non-rotatable weld members have been firmly clamped in their respective holding devices, the electric motor 21 will be actuated. This causes the shaft 59, flywheel 61, and member 57 of the clutch assembly 55 to rotate also. The entire clutch assembly will not rotate since the clutch is disengaged and no fluid is being fed thereto by the line 73. Therefore, the shaft 47, the gear train, and the spindle shaft 28 will remain stationary. When the shaft 59 and flywheel 61 reach the exemplary maximum velocity of 5000 r.p.m., the clutch assembly 55 will be engaged by feeding fluid through the line 73 to the assembly. Simultaneously, the brake assembly 51 will be disengaged and the shaft 47, the gear train, and the spindle shaft 27 will be accelerated.

Since the mass of the flywheel 61 is large in comparison to the mass of the spindle shaft and the gear train, the flywheel will act as the power accumulator and the spindle shaft and the rotatable weld members 33 will be accelerated to the welding velocity in a very short period of time. As the spindle shaft and the gear train are accelerating, the flywheel will decelerate slightly. However, because of the great difference in the selected masses, the flywheel speed will drop only about 5% before the spindle shaft reaches the welding velocity.

When the welding velocity is reached by the spindle shaft, the clutch assembly will be disengaged and the brake assembly engaged. This will cause the shaft 47 and the gear train to stop and they will become disconnected from the spindle shaft 27 by means of the one-way clutch assembly 29.

When the clutch assembly 55 becomes disengaged, the shaft 59 and flywheel 61 will then be reaccelerated by the motor 21 to the original velocity of 5000 r.p.m. Thus, the flywheel represents a continuously ready power supply to accelerate the spindle whenever the clutch 55 is engaged.

When the brake assembly 51 is engaged, the gear train will become disconnected from the spindle shaft almost immediately due to overrunning of the one-way clutch assembly 29. Thus, the shaft 47 and the gear train will add no energy to the weld.

To initiate welding, the thrust cylinders 75 of the tailstock assemblies 15 and 17 are activated to cause the work fixtures 77 to move toward the respective spindles. The non-rotating weld members 71 then will come into contact with the rotating weld members 33 and the stored energy will be converted to heat and the members will be welded together.

When the weld is completed the spindle shaft will have come to a stop and the completed weld assemblies can then be removed from the holding fixtures. The thrust cylinders will be deactivated and new weld pieces can then be firmly clamped into the respective holding fixtures. The process is now ready for repetition and will be initiated by the engaging of the clutch assembly 55 and the disengaging of the brake assembly 51. Since the flywheel 61 will have already attained its maximum speed, there will be no delay in waiting for the power source to come to speed. The total welding process can then be repeated.

Thus, one embodiment of a new and improved concept in the inertia welding art has been disclosed which yields a true advancement in that art. Those skilled in the art will readily see many modifications and alterations within the scope of this invention wherefore what is claimed is:

1. A friction welding machine of the kind in which two workpieces are engaged in rubbing contact under axial load to produce a weld across the interface and comprising:
   a non-rotatable chuck for holding one workpiece,
   a rotatable chuck for holding the other workpiece,
   a rotatable spindle mounting the rotatable chuck,
   a motor,
   a flywheel connected for continuous rotation by the motor,
   a drive train including a clutch and a brake between the flywheel and the spindle, and
   an overrunning clutch connecting the drive train to the spindle when the speed of the drive train is greater than the speed of the spindle and disconnecting the spindle from the drive train when the speed of the drive train is less than that of the spindle, and
   wherein the clutch connects the flywheel to the drive train only during acceleration of the spindle to welding speed and the brake is actuated to brake the drive train after the spindle has been accelerated to the welding speed to thereby cause the spindle to overrun the drive train until the spindle is stopped by the weld so that the flywheel is used only as a power source for accelerating the spindle and the weld energy is limited to that which has been stored as inertial energy in the rotating spindle and chuck.

2. A method of making a friction weld with a welding machine of the kind having a non-rotatable chuck for holding one workpiece to be welded, a rotatable chuck for holding a second workpiece to be welded, a rotatable spindle on which the rotatable chuck is mounted, a motor, a flywheel, a drive train including a clutch and a brake between the flywheel and the spindle and an overrunning clutch between the drive train and the spindle, said method comprising,
   accelerating the flywheel to a selected speed of rotation by the motor while the clutch disconnects the flywheel from the rest of the drive train and the spindle,
   connecting the clutch to cause the flywheel to accelerate the spindle to a welding speed,
   disconnecting the clutch to disconnect the flywheel from the rest of the drive train and actuating the brake to cause drive train to slow below the speed of rotation of the spindle and to thereby cause the spindle to overrun the drive train through the overrunning clutch,
   engaging the workpieces under axial load to make the friction weld as the spindle continues to overrun the braked gear train until hte weld is completed as the spindle is stopped by the weld,
   whereby the flywheel is used only to accelerate the spindle to welding speed and the weld energy is limited to that which had been stored as inertial energy in the rotating spindle and rotating chuck.

References Cited
UNITED STATES PATENTS

| | | | |
|---|---|---|---|
| 3,234,644 | 2/1966 | Hollander | 29—470.3 |
| 3,235,158 | 2/1966 | Hollander | 228—2 |
| 3,235,162 | 2/1966 | Hollander | 29—470.3 |

JOHN F. CAMPBELL, Primary Examiner

R. J. CRAIG, Assistant Examiner

U.S. Cl. X.R.
156—73; 228—2